United States Patent
Conaway et al.

(10) Patent No.: US 12,506,660 B2
(45) Date of Patent: Dec. 23, 2025

(54) NODE FOR PROVIDING POWER AND COMMUNICATION FUNCTIONALITY TO FIELD DEPLOYED SYSTEMS

(71) Applicant: Electronic Warfare Associates, Inc., Herndon, VA (US)

(72) Inventors: Jeffrey M. Conaway, Ridgecrest, CA (US); Paul D. Knight, Camarillo, CA (US); Terrence K. Clark, Ventura, CA (US); Lester A. Foster, III, Frederick, MD (US)

(73) Assignee: Electronic Warfare Associates, Inc.

( * ) Notice: Subject to any disclaimer, the term of this patent is extended or adjusted under 35 U.S.C. 154(b) by 683 days.

(21) Appl. No.: 17/664,786

(22) Filed: May 24, 2022

(65) Prior Publication Data

US 2023/0388190 A1    Nov. 30, 2023

(51) Int. Cl.
*H04L 41/12*    (2022.01)
*H02J 4/00*    (2006.01)
*H02J 13/00*    (2006.01)
*H04L 41/0823*    (2022.01)

(52) U.S. Cl.
CPC ........... *H04L 41/12* (2013.01); *H02J 4/00* (2013.01); *H02J 13/00006* (2020.01); *H04L 41/0823* (2013.01); *Y04S 40/121* (2013.01)

(58) Field of Classification Search
None
See application file for complete search history.

(56) References Cited

U.S. PATENT DOCUMENTS

2004/0024913 A1*  2/2004  Ikeda .............. H04B 3/54
                                                     709/249
2006/0286927 A1* 12/2006  Berkman .......... H04H 20/84
                                                     375/257

(Continued)

FOREIGN PATENT DOCUMENTS

CN          101447114       *  6/2009

OTHER PUBLICATIONS

Altronix—NetWaySP4WPX product listing. https://www.altronix.com/products/NetWaySP4WPX (Year: 2019).*

(Continued)

*Primary Examiner* — Andre Tacdiran
(74) *Attorney, Agent, or Firm* — DLA Piper LLP (US)

(57) ABSTRACT

A node for providing electrical power and one or more communication links to a field deployed system is disclosed. The node may comprise a power distributor configured to receive electrical power from an external power source and controllably distribute the electrical power to the field deployed system, an interface comprising a plurality of data ports configured to be connected to data lines of a corresponding plurality of components of the field deployed system, a plurality of communication links configured to transmit or receive data associated with the plurality of components of the field deployed system, and a router configured to route communication messages between the plurality of data ports and the plurality of communication links. The node may further comprise one or more processors configured to control the power distributor, the plurality of data ports, the plurality of communication links, and the router.

18 Claims, 4 Drawing Sheets

(56) References Cited

U.S. PATENT DOCUMENTS

| | | | | |
|---|---|---|---|---|
| 2008/0133806 A1* | 6/2008 | Mori | ............... | H02G 3/32 |
| | | | | 710/72 |
| 2009/0228722 A1* | 9/2009 | Lin | ............... | H04L 12/10 |
| | | | | 713/300 |
| 2015/0382155 A1* | 12/2015 | Ulliman | ............ | H04W 4/021 |
| | | | | 455/456.1 |
| 2016/0337137 A1* | 11/2016 | Yseboodt | ............ | H04L 12/10 |
| 2017/0244543 A1* | 8/2017 | Raj | ............... | H04L 67/12 |
| 2017/0336846 A1* | 11/2017 | Shieh | ............ | G06F 13/4282 |
| 2020/0389240 A1* | 12/2020 | Lorman | ............ | H04L 69/18 |

OTHER PUBLICATIONS

TP-Link TL-PA9020P Tom's Guide. https://www.tomsguide.com/reviews/tp-link-tl-pa9020p-powerline-extender(2020) (Year: 2020).*

\* cited by examiner

NODE FOR PROVIDING POWER AND COMMUNICATION FUNCTIONALITY TO FIELD DEPLOYED SYSTEMS

BRIEF DESCRIPTION OF DRAWINGS

The figures are for purposes of illustrating example embodiments, but it is understood that the present disclosure is not limited to the arrangements and instrumentality shown in the drawings. In the figures, identical reference numbers identify at least generally similar elements.

DESCRIPTION

Embodiments disclosed herein describe a node that may provide electrical power and communication functionality for field deployed systems. The field deployed systems may include, for example, weapons testing systems, mining systems, and/or any other type of remotely deployed systems that may not have ready access to electrical power and communication infrastructure. To provide electrical power to such field deployed systems, the node may receive power from an external power source (e.g., an electrical generator coupled to a rechargeable battery) and controllably provide the received power to the components (e.g., sensors) of the field deployed systems. To provide the communication functionality, the node may embed various types of communication technologies such as cellular, satellite, and/or any other type of wireless radio transmission. Using the communication links enabled by such technologies, a remote central controller system may communicate with the field deployed systems to control the corresponding components. Such communication may include providing configuration parameters to set up the components and the external power source for operation, and then gathering the operational data during the operation.

An example node may include a plurality of components such as processors, routers, power distributors, sensors, antennas, etc. The routers may allow a flexible data routing between the communication links and the corresponding components of the field deployed system. The power distributors may controllably provide any type of power, e.g., alternating current (AC) power including 3-phase AC or single-phase AC, direct current (DC) power, based on the power requirements of the components. The processors may control the overall operation of the node, such as controlling the extraction of power from the external power source, detecting security breaches, coordinating the communication with the central controller, allowing a local processing device to be connected to the node, etc. The antennas may facilitate wireless communications and the sensors may measure various environmental parameters.

In an embodiment, a node for providing electrical power and one or more communication links to a field deployed system is provided. The node may comprise a power distributor configured to receive electrical power from an external power source and controllably distribute the electrical power to the field deployed system; an interface comprising a plurality of data ports configured to be connected to data lines of a corresponding plurality of components of the field deployed system; a plurality of communication links configured to transmit or receive data associated with the plurality of components of the field deployed system; a router configured to route communication messages between the plurality of data ports and the plurality of communication links; and one or more processors configured to control the power distributor, the plurality of data ports, the plurality of communication links, and the router.

In another embodiment, a system may be provided. The system may comprise a central controller comprising one or more applications configured to be executed by one or more computing systems; a network configured provide communication between the central controller and a plurality of nodes remote from the central controller, the network comprising radio relay nodes, the network further comprising wireless access points configured to connect wireless communications to a wired terrestrial information technology network; the plurality of nodes being configured to provide electrical power and a communication functionality to corresponding field deployed systems, at least one of the plurality of nodes comprising: a plurality of communication links configured to communicate with the central controller through the network; an interface comprising a plurality of data ports to be connected to plurality of components of the field deployed system; a router configured to route communication messages between the plurality of data ports and the plurality of communication links; a power distributor configured to receive electrical power from an external power source and controllably distribute the electrical power to the field deployed system; and one or more processors configured to control the plurality of communication links, the interface, the router, and the power distributor.

In yet another embodiment, a method may be provided. The method may comprise receiving, by a node providing electrical power and a communication functionality to a field deployed system, one or more configuration parameters from a remote central controller; transmitting, by the node, the one or more configuration parameters to a plurality of components of the field deployed system and an external power source; controllably distributing, by the node, power received from the external power source to the plurality of components based on the one or more configuration parameters; continuously gathering, by the node, data from the plurality of components of the field deployed system; transmitting, by the node, the gathered data to the remote central controller.

Figure 1:
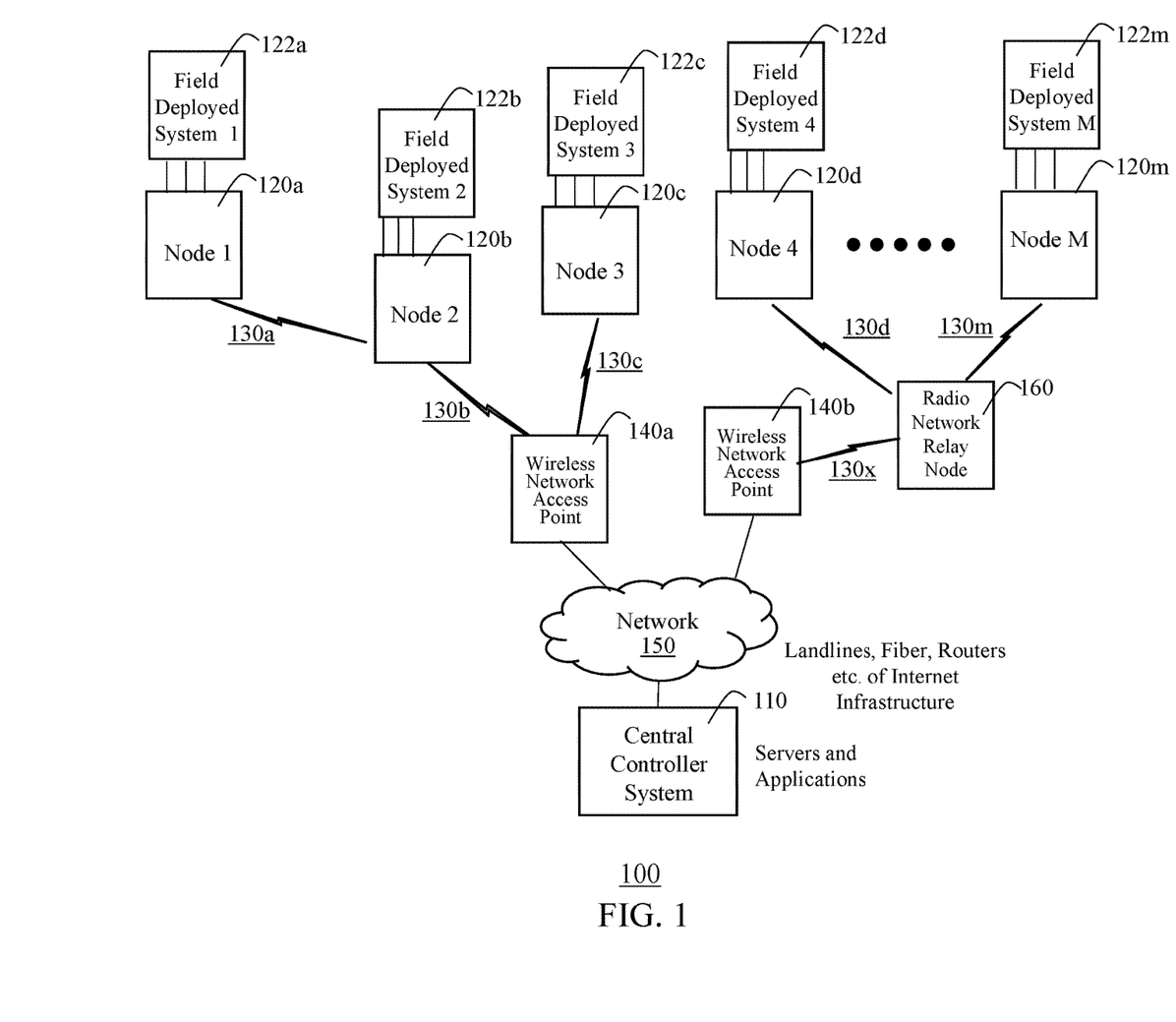
FIG. 1 shows an illustrative operating environment, where some embodiments of the present disclosure may be employed.

FIG. 1 shows an illustrative operating environment 100, where some embodiments of this disclosure may be employed. The shown components of the operating environment 100 are merely illustrative and operating environments with additional, alternative, and fewer number of components should also be considered within the scope of this disclosure. Furthermore, the names provided to the different components is just for convenience, and persons having ordinary skill in the art may refer to these components with other names without deviating from the scope of this disclosure. Furthermore, the functionality of each of the components described below is just for illustration, and while various components described herein may provide the functionality described, the description thereof should not be considered limiting regarding all functionality capable of being provided by the components.

As shown, the operating environment 100 may include a plurality of nodes 120a-120m (collectively referred to as nodes 120 and commonly referred to as node 120) configured for the corresponding field deployed systems 122a-122m (collectively referred to as field deployed systems 122 and commonly referred to as a field deployed system 122). The nodes 120 may be wirelessly connected to a network 150 through wireless network access points 140a-140b (collectively referred to as wireless network access points 140 and commonly referred to as wireless network access point 140) and a radio network relay node 160. A central controller system 110 may communicate with the nodes 120 through the network 150.

The operating environment 100 may be used for providing power (e.g., electrical power) and communication functionality for the multiple field deployed systems 122. The field deployed systems 122 may often be located at remote places without access to a power grid or communication infrastructure. For example, a field deployed system 122 may include instrumentation for testing defense systems (e.g., weaponry or defense therefrom). Weapons testing is generally at remote, uninhabited locations—therefore a node 120 may provide electrical power and communication functionality to the corresponding field deployed system 122. As described in more detail below in reference to FIG. 2, the node 120 may receive power from a power source (e.g., a diesel-powered electrical generator) and distribute the received power, in alternating current (AC) and/or direct current (DC) form, to different components of the field deployed system 122. For example, the distributed power may be used by a sensor (e.g., a camera) of the field deployed system. As also detailed below in reference to FIG. 2, the node 120 may provide a communication functionality such that remote systems may communicate with (e.g., provide instructions to and/or extract data from) the field deployed system 122 through the node 120.

Figure 3:
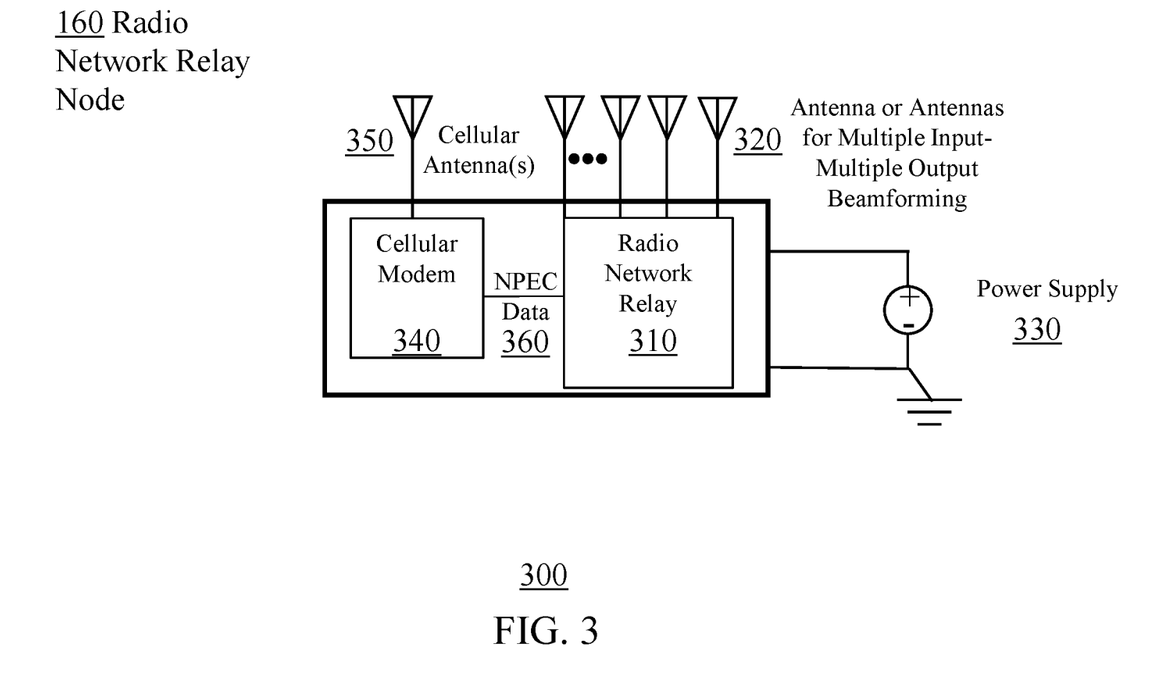
FIG. 3 shows an example configuration of a radio network relay node, according to some embodiments of the present disclosure.

Wireless links 130 may provide communication links between the nodes 120 and the wireless network access points 140, which in turn may be connected to the network 150. The wireless links may include any kind of wireless communication technology 130 such as cellular, satellite modem, radio, mesh networking radio, etc. Generally, the operating environment 100 may use any commercially available technology for the wireless links 130 for data transportation to and from the nodes 120. The wireless network access points 140 may use any type of wireless transmission and receiving functionality to transmit and receive data from the corresponding wireless links 130. For example, the wireless network access points 140 may include wireless routers, wireless antennas, and/or any other type of component that may support communication through the wireless links 130. Generally, a wireless network access point 140 may form a communication access point with the network 150. In some embodiments, a radio network relay node 160 may be used in between a node 120 and a wireless access point 140. A radio network relay node 160 may not necessarily be a signal source or a signal destination, but rather propagate (e.g., relay) a signal received from a signal source to its intended destination. For example, in the operating environment 100, the radio network relay node 160 may receive a signal from node 120m and then relay the received signal to the wireless network access point 140b. The radio network relay node 160 may be used when the node 120m may be out of range for the wireless network access point 140b. An example of network relay node is shown in FIG. 3 and it may include an internal cellular modem to interface to interface with a cellular wireless network access point 140.

The network 150 may include any kind of network. For example, the network 150 may include a packet-switching, internet protocol (IP)-based network. Using the IP-based network, the central controller system 110 may communicate with the nodes 120 using IP packets. It should however be understood that the network 150 is not confined to just IP based network and may include circuit switching networks such as telephonic networks, for example, and/or other networks.

The central controller system 110 may transmit messages to the nodes 120 through the network 150, wireless network access points 140 and/or relay nodes 150, and wireless links 130. The messages from the central controller system 110 may include one or more configuration parameters for the components of the field deployed systems 122 and the external power sources. The messages received at the central controller system 110 may include data generated by the components of the field deployed systems 122, external power sources, and/or the nodes 120; as described throughout this disclosure. To support the functionality described throughout this disclosure, the central controller system 110 may comprise one or more computing devices (e.g., one or more servers) and one or more applications being executed thereon.

Figure 2:
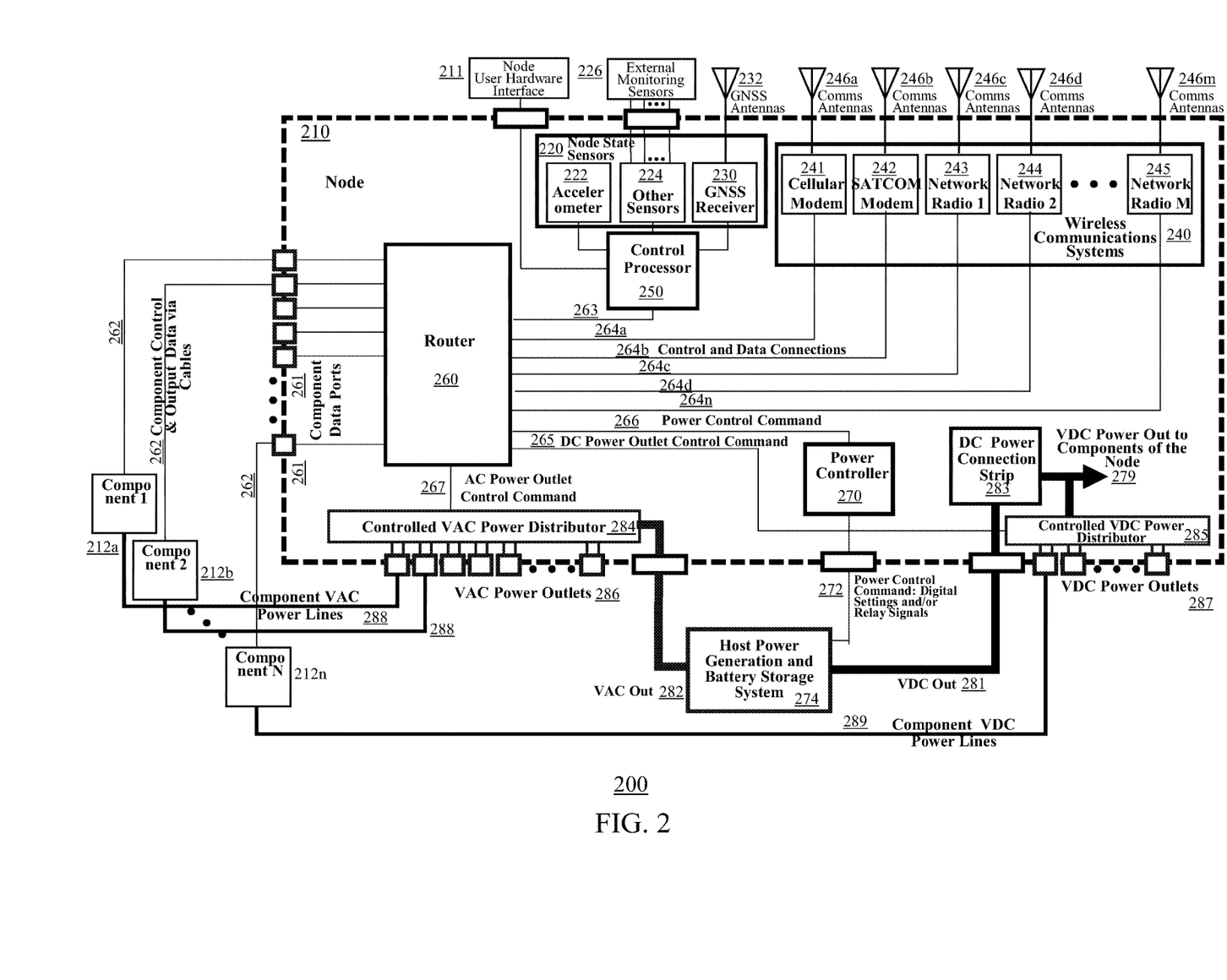
FIG. 2 shows an illustrative architecture of a node, according to some embodiments of the present disclosure.

FIG. 2 shows an illustrative architecture 200 of a node 210 (which may be similar to the node 120 shown in FIG. 1), according to some embodiments of this disclosure. The node 210 may provide operational power (e.g., electrical power) and communication functionality components 212a-212n (collectively referred to as components 212 and commonly referred to as component 212) of a field deployed system. It should be understood that that architecture 200 is just an example, and architectures with additional, alternative, or fewer number of components should also be considered within the scope of this disclosure. Furthermore, the names provided to the different components are just for convenience, and persons having ordinary skill in the art may refer to these components with other names without deviating from the scope of this disclosure. Furthermore, the functionality of each of the components described below is just for illustration, and while various components described herein may provide the functionality described, the description thereof should not be considered limiting regarding all functionality capable of being provided by the components.

To provide operational power to the components 212 of the field deployed system, the node 210 may extract power from a host power generation and battery storage system 274. For example, the circuitry of the node 210 may be enclosed within an enclosure for environmental protection and mounted on a platform with the host power generation and battery storage system 274. In some embodiments, the platform may include a stationary pallet that is offloaded at the site containing the node 210 and the field deployed system. In other embodiments, the platform may include a trailer or a vehicle such as a truck or watercraft. Regardless of the type of the platform, it should generally be understood that the node 210 may provide an intermediate power control functionality between the host power generation and battery storage system 274 and the components 212 of the field deployed system.

The host power generation and battery storage system 274 may include power sources such as internal combustion engine electrical generators. For example, a liquid fuel (e.g., gasoline, diesel) based generator may be deployed to generate an AC power and/or a DC power and charge a battery. The generator may supply the power directly to the node and when the generator is not running, the charged battery may provide the stored power. Other power generation technology in the host power generation and battery storage system 274 may include solar panels, windmills, hydroelectric turbines, and/or any other remotely deployable power generator and storage technology.

The power from the host power generation and battery storage system 274 may be supplied to the node 210 using an AC power line 282 and/or DC power line 281. (The power lines are shown in FIG. 2 with thicker tracing than the data lines). In case of a power source being a generator, the AC power line 282 may be used to apply an AC power generated to the node 210. For the cases where the generator is not running, DC power from a charged battery (e.g., charged by the generator) may be supplied to the node 210 using the DC power line 281. The AC power at the AC power line 282 may also be rectified directly (e.g., without necessarily charging a battery) and provided to the DC power outlets 287. In some embodiments, the power provided using the AC power lines 282 may comprise three-phase outputs for the node 210 for a controlled AC power distributor 284 to provide different voltage outputs at AC power outlets 286 of the node 210. The different AC voltage outputs, generated by the controlled AC power distributor 284 at the AC power outlets 286, may include, e.g., 120 V AC, 240 V AC, 360 V AC, etc. In other embodiments, the host power generation and battery storage system 274 use a motor-powered electrical generator to provide a single-phase AC through the AC power line 282. In these embodiments, the AC power outlets 286 may provide a single-phase AC output to the components 212 of the remotely deployed system. An appropriate source of power generation (e.g., electrical generator) and storage (e.g., a battery) may be selected based on the requirements and accessibility of the components 212 of the field deployed system. The selection may factor in high power duty cycle of operating the node 210 as well as off cycle operational power requirement for the host power generation and the battery storage system 274 to harvest energy and/or recharge for the next high-power duty cycle.

In cases of the host power generation and battery storage system 274 using alternative power sources such as solar panels or windmills, the DC power generated by these power sources may be converted to AC power using DC-to-AC power converters (e.g., power inverters). The converted AC power may be then provided to the controlled AC power distributor 284 to distribute the AC power to the AC power outlets 286. Additionally or alternatively, the DC power generated by the alternative power sources may be stored in the battery and provided to a controlled DC power distributor 285 to power the DC power outlets 287.

The host power generation and battery storage system 274 may be controlled by a power controller 270, which may provide command and control signals 272 to the host power generation and battery storage system 274. The command and control signals 272 may include digital settings and/or relay signals. For example, in the case of the host power generation and storage system 274 using an electrical motor, the power controller 270 may provide control signals to initiate the operation of the electrical motor. If the electrical motor is digitally controlled, the power controller may provide digitally encoded instructions. If the electrical motor is simpler (e.g., without digital controls), the power controller 270 may provide a relay signal to activate the electrical motor. In case of the host power generation and battery storage system 274 harvesting power (e.g., using solar cells), the power controller 270 may monitor energy levels at the storage batteries of the system 274 and report the energy levels to a remote device (e.g., central controller 110 shown in FIG. 1) so that a user may assess if sufficient power is available for the remote node 210 to operate the components 212 of the field deployed system.

In the embodiment where the host power generation and battery storage system 274 comprises an electrical generator driven by an internal combustion engine, the power controller 270 may control the internal combustion engine. If it is determined that a storage battery of the system is running low, the power controller 270 may receive a power control command through the data line 266 (e.g., the command may originate from the central controller system 110, as shown in FIG. 1). Based on the received command, the power controller 270 may activate the internal combustion engine generator. In case the generator is digitally controlled, the power controller 270 may provide digital word commands to the generator through the data line 272. A digital word command may be used to activate the generator and another digital command may be used to stop the generator. For less complex generators (e.g., non-digital), the power controller 270 may provide a relay switch signal through the data 272 to activate the generator. An absence of the relay switch signal may indicate to the generator that it should turn off.

The components 212 may therefore be plugged into AC power outlets 286 or DC power outlets 287 based on the type of power required. For example, if a component 212 is a DC powered camera, the DC powered camera may be plugged into a DC power outlet 287. Alternatively or additionally, the controlled DC power distributor 285 may control the supply of the DC power at the DC power outlets 287 based on the DC power outlet control command received via data line 265. The DC power outlet control command may instruct the controlled DC power distributor 285 to activate one of more of the DC power outlets 287 and further set the levels of the DC power supplied at the activated DC power outlets 287. As another example, if a component 212 is an AC powered electrical motor, the AC powered electrical motor may be plugged into the AC power outlet 286. Alternatively or additionally, AC power lines 288 may be used to transmit AC power to the corresponding component 212 from the AC power outlets 286. The AC power outlets may be controlled by the AC power distributor 284 using an AC power outlet control command received via a data line 267. The command may instruct the controlled AC power distributor 284 to activate an appropriate AC outlet and the select the power level (e.g., 120 V AC, 240 V AC) of the activated outlet. To power the components of the node 210 itself, a DC power connection strip 283 may be used, which may supply a DC power 279 to the components of the node 210.

Therefore, the node 210 may be used to extract power from any type of sources in the host power generation and battery storage system 274 and distribute the extracted power, in either of DC or AC form, to the components 212 of a remotely deployed system. The overall power operations may be controlled by the power controller 270, which in turn may be controlled through a power control command received via a data line 266. The power control command may be generated by the control processor 250 and then provided to the data line 266 by the router 260.

For facilitating communication functionality of the components 212 of the field deployed system, the node 210 may include wireless communication systems 240. The wireless communication systems 240 may use any type of technology such as cellular modem 241 of standards such as LTE, 5G, etc. (e.g., when the node 210 is within reach of a cellular telephony infrastructure). In this case from FIG. 1, the wireless access point may be cellular telephony tower. As shown, the cellular modem 241 may use communication antennas 246a for cellular signals. In other cases, such as where the node 210 is too far from a terrestrial communication infrastructure, satellite communication modem 242 may be used. As shown, the satellite communication modem may use communication antennas 246b for the satellite communication signals. In this case, the wireless network access point 140 may be satellite communication infrastructure that connects directly from a node 120 (e.g., node 120c connecting directly to the wireless network access point 140a, using a connection 130c as shown in FIG. 1).

The wireless communication systems 240 may further use a variety of network radio communication links 243, 244, and 245 that may access different types of infrastructure wireless access points (e.g., wireless access points 140 shown in FIG. 1) via their external antennas 246c, 246d, and 246m. The external antennas 246c, 246d, and 246c may be designed to operate at different frequency bands of operation (e.g., corresponding to the wireless access points they communicate with). In some embodiments, one or more of the network radio communication links 243, 244, and 245 may include WiFi, WiMax, and/or other wireless modern standards. In other embodiments, network radio communication lines 243, 244, and 245 may employ Multiple-Input Multiple-Output (MIMO) radio technology, using the antennas 245c, 246d, and 246m as antenna arrays. The wireless communication systems 240 may also include mesh networking between different nodes using the communication antennas 246a-246m for the communications associated with mesh networking. In the mesh networking scenario, each node 210 may not have to be connected to a wireless access point. Rather, another node 210 within the system may relay messages between the node 210 and the wireless access point. With the mesh networking, the network wireless access point 140 may contain a networking radio which may interface to one of the node network radios 243, 244, and 245 with direct wired connection to standard telecommunication wired networks 150.

Regardless of the connectivity technology, the external communication data streams may be encrypted for information security using technology such as 128 or 256-bit Advanced Encryption System (AES). In some embodiments, data passing from or through the node 210 may exceed 100 Megabits per second. Data rates however may depend on the components 212 and their data flow requirements, the number of components 212 connected to the node 210, and/or whether the node 210 is a part of a mesh networking relay.

The node 210 may also include a plurality of node state sensors 220 (e.g., controlled by the control processor 250) to collect information of the node 210 itself. It should be understood that these sensors 200 are for monitoring the node 210 and may be different from the sensors (e.g., components 212) of the field deployed system. The node state sensors 220 may not require full power capability of the node 210, and their data sensing may be performed continuously over time at the user defined (e.g., a low rate, a high rate) duty cycle. Some non-limiting examples of the node state sensors 220 may include an accelerometer 222, a Global Navigation Satellite Sensor (GNSS) receiver 230 (with a corresponding GNSS antennas 232), and/or other sensors 224. In the embodiments where the node 210 may be mounted on a same platform as the host power generation and battery storage system 274, the accelerometer 222 may measure the vibrations of the platform to determine if a motor or a generator of the system 274 is active. The accelerometer 222 may therefore operate as a back-up sensor to validate that a power generator within the system 274 is operating, which may be used to record time of operation of the power generator to support the power generator maintenance such as oil change or other servicing of the power generator. Furthermore, the accelerometer 222 may provide a back-up sensor data for a compliance with air quality regulation (e.g., some states may allow a power generator to operate continuously for a predetermined amount of time, and the accelerometer 222 may indicate that the power generator is indeed complying with this requirement). Furthermore, the accelerometer 222 may perform as a tampering disturbance sensor to detect if someone or something (e.g., humans or fauna) is interacting with the node 210 causing the node to move or jostle. Generally, the accelerometer 222 and other sensors generally may detect security breaches with humans or fauna adversely impacting the node 210 or the connected field deployed system. The data from the accelerometer 222 may be received by the control processor 250, and the control signals to the accelerometer may be provided by the control processor 250.

The GNSS receiver 230 may geolocate the node 210 and may also provide an absolute time clock reference (e.g., based on receiving time clock signals from a subset of GNSS satellites) to the node 210. Using the data from the GNSS receiver 230, components in an operating environment (e.g., operating environment 100 shown in FIG. 1) may confirm that the node 210 is at a desired location and has not been moved. It should be understood that GNSS receiver 230 providing the geolocation functionality is just an example, and other technology may be used for similar functionality. For example, the node may use a GPS receiver instead of or in addition to the GNSS receiver 230. Other types of GNSS receivers may be used, including but not limited to GLONASS, Beidou, or Galileo receivers.

The node 210 may include other sensors 224, which may be connected to external monitoring sensors 226, to monitor the operation of the node 210. For example, in the embodiment where the host power generation and battery storage system uses a power generator with a battery reserve power storage, either one of the other sensors 224 or external monitoring sensors 227 may include a volt meter. The volt meter may measure the DC voltage from the DC power connection strip 283, and the control processor 250 may use this voltage measurement to determine if and when the generator in the system 274 may have to be activated to recharge the battery in the system 274. As another example, the external monitoring sensors 226 may include weather sensors that may measure weather parameters such as temperature, humidity, or atmospheric pressure. The external monitoring sensors 226 may also include sensors to measure other parameters such as precipitation, wind, ambient light, or visibility. Another example of the external monitoring sensors may include a microphone that may facilitate the control processor 250 to determine that the sound produced by the host power generation and battery storage system 274 and/or the components 212 of the field deployed system does not exceed environmental noise or sound thresholds.

The external monitoring sensors 226 may also include sensors for gathering data about the host power generation and battery storage system 274 that may not have a data connection with the node 210. For instance, the external monitoring sensors 226 may include an engine exhaust emissions sensor for the control processor 250 to determine if the engine exhaust emissions comply with the emission regulations (e.g., by maintaining a required air quality) of the corresponding jurisdiction. Another example of the external monitoring sensors 226 may include a fuel tank measurement level sensor that collect data regarding the fuel consumption rate and remaining fuel status. The external monitoring sensors 226 may also monitor the operational time of the engine and/or the electrical generator in the host power generation and battery storage system 274. The monitoring the operational time may allow the central processor 250 to determine the oil life or maintenance schedule of the engine. In case of an electrical generator, the monitoring of the operational time may allow the central processor 250 to determine if one or more components of the electrical generator need servicing. Additionally, the external monitoring sensors 226 may monitor the operational time of the field deployed system, which may allow the control processor to determine time for servicing one or more components of the field deployed system. This monitoring may also allow the control processor 250 to determine time for a recalibration of instrumentation of the field deployed system. The external monitoring sensors 226 may include a class of security sensors (e.g., anti-tamper sensors) to mitigate wildlife and people from tampering, interfering, damaging, or stealing the node 210 or other components associated with the node 210. It should be understood that the aforementioned monitoring operations of the external monitoring sensors 226 may be controlled by the control processor 250.

Several components 212 of the field deployed system may be connected to the node 210 through component data ports 261. Additionally or alternatively, data lines 262 may be provided to the components from the data ports 261 to the components 212. Using the data ports 261 and/or the data lines 262, the node 261 may support any type of component 212. Some non-limiting examples of the components 212 may include pan/tilt/zoom camera systems in different electromagnetic spectral bands (e.g., ultraviolet, visual, infrared, etc.), acoustic data collection microphones, radio and radar sensors, seismometers, chemical sensors, biological sensors, radiological sensors, etc. Other components 212 connected to the node 210 may include, but are not limited to, pumps, gates, platform lifts/elevators, conveyance belts, fans, signal generators generators/radiators in acoustic/electromagnetic spectra, etc.

In an example operation of the field deployed system, the components 212 may receive configuration data from a central controller system (e.g., central controller system 110 shown in FIG. 1) through the wireless communication systems 240 of the node 210. The configuration data may be received through the data lines 264 by the router 262, which in turn may transmit the received configuration data to the data lines 262. The configuration data may provide configuration settings (e.g., a pan and a tilt for a camera) to components 212. After the components 212 have been set to operate, return data generated by the components 212 may flow back through the data lines 262, the router 260, data lines 264, wireless communication systems 240, and external wireless communication links to the central controller system. Therefore, using the node 210, the central controller may set and control the components 212 and receive data back from the components 212.

The flow of communication between different components of the node 210, e.g., the flow of configuration data from wireless communication systems 240 to the components 212 and the back data flow from the components 212 to the wireless communication systems 240, may be managed by the router 260. The router 260 may include a plurality of switches, which may be controlled by control signals received through a data line 263 from the control processor 250, to direct incoming data from the data lines 264 to outgoing data lines 261, or vice versa. The router 260 may furthermore direct other control signals from the control processor 260, e.g., DC power outlet control command through data line 265 or AC power outlet control command through data line 267, to the corresponding destinations. Therefore, it should be generally understood that the router 260 may interface different components of the node 210, and relay instructions, device configurations, and device commands; and query device status of the internal components and/or the external components (e.g., components 212 of the field deployed system).

In some embodiments, the router 260 may include one router switch. In other embodiments, the router 260 may include multiple router switches. For instance, the router may include a low power router switch that may operate in a low power mode when a power generator of the host power generation and battery storage system 274 has not been operating. The low power router switch may facilitate operation of the node when the node is running on battery power or when the host power generation and battery storage system 274 is harvesting power from other sources (e.g., solar power). The router 260 may include another high-power switch that may be implemented the power generator in the host power generation and battery storage system 274 is active.

The router 260 may implement IP protocol with the connected devices having corresponding IP addresses. Use of the IP protocol may allow the node 210 and the components 212 not to have data residing locally after an active operation cycle. For instance, as the active operation progresses, the generated data may be routed from the components 212 through the data lines 262 to the router 260, which may then use data lines 264 to transmit the received data to the wireless communications systems 240. The wireless communications systems 240 may use one or more wireless communication links (e.g., radio repeaters, mesh network) to transmit the data to the central control system. Therefore, when the node 210 is not actively providing power and extracting data from the components 212, there may be no data residing within the node 210. This configuration may provide information security in case the node 210 is compromised by a remote hacker to gather any node data or by someone who locates the node 210 and attempts to interface the node 210 with direct physical connection (e.g., through node user hardware interface 211) to collect internal data from the node 210.

A central controller system (e.g., central controller system 110 shown in FIG. 1) may generally know the internal configuration of the node 210 and may be able to access any device or subsystem connected to the router 260. In one embodiment, the central controller system may identify the devices and subsystems connected to the router 260 via IP addresses. The identified devices and subsystems may be mapped into a network topology as a part of configuring the node 210. This known and/or expected mapping may allow the central controller system to detect if an intruder or a hacker has connected another component or device to the node 210, or, the node has been tampered with by the addition or subtraction of addressed devices. Therefore, the network mapping may provide an additional layer of security.

The control processor 250 may include any type of processing device (e.g., an x86 processor or an ARM processor) that may control the overall functionality of the node 210. However, it should be understood that the separate central processor 250 is just an example and the processing functionality may reside within individual components of the node 210 in some embodiments. In other embodiments, the functionality of the control processor 250 may reside on a dedicated small board computer and/or a microcontroller. Regardless of its functional arrangement, the control processor 250 may interface with other devices in the node through router 260. The control processor 250 may also interact with the node state sensors 220 and interact with an external connected device through the node user hardware interface 211. For example, the node user hardware interface 211 may allow a user to connect a computing device (e.g., a laptop computer) to interact with and control the functionality of the node 210.

In operation, the control processor 250 may monitor and control the sensors 220. For example, the control processor 250 may manage the local clock and record the state of the sensors 220. The control processor 250 may then report back the state of the sensors 220 to the central controller system 220. For example, if the host power generation and battery storage system 274 uses a power generator, the processor 250 may record the duration of the operation of the power generator by sampling the accelerometer 222 which may show the power generator's vibrations indicating that the power generator is running. At the end of the power generator's cycle, the processor 250 may communicate back (e.g., through the wireless communications systems 240) back to the central controller with a power generator status report. As another example, the control processor 250 may query different sensors 220 when the node 210 is not active. For example, the central processor 250 may monitor the GNSS receiver 230 and/or the accelerometer 222 to detect whether the node 210 has an unauthorized movement. Also, the processor 250 may monitor the node user hardware interface 211 to detect if any unauthorized access attempt is made on the node 210. The control processor 250 may report back any potential unauthorized and malicious activity back to the central controller system.

In another example of the control processor 250 operation, the control processor 250 in a low power mode may monitor different node state sensors 220 to keep the node 210 continuously operational. For example, if the host power generation and battery storage system 274 utilizes an internal combustion engine powered electrical generator, a voltmeter (an example of the other sensors 224) may report to the processor 250 that the DC power connection strip voltage 283 is below a threshold. The control processor 250 may then instruct the power controller 70 (through the data line 266) to start the electrical generator to recharge the battery within the system 274.

The above are just but a few examples of the control processor 250 monitoring the different node state sensors 220 and controlling the operational behavior of the node 210 based on the state of the sensors 220. The control processor 250 may generally monitor all the sensors in the node continuously, and if any sensor indicates a condition outside of a normal operational threshold, the control processor 250 may generate a corresponding report back to the central controller system. Such continuous monitoring and reporting may reveal whether the node 210 is operating or resting within the desired parameters. For example, the external monitoring sensors 226 may continuously monitor the environmental condition (also referred to as environmental parameter) around (i.e., in proximity) the node 210. Based on the monitored environmental condition, the control processor 250 may determine that there is an adverse condition that may affect the performance of the node 210 and/or the components 212 of the field deployed system. For instance, the conditions may be windy or dusty, or may have higher than expected temperature. These conditions may require the components 212 to be calibrated differently, e.g., through specific configuration parameters different from the normal configuration parameters. The control processor 250 monitoring and reporting back the environmental data may assist the central controller system for such special configuration.

As discussed above, the node user hardware interface 211 may allow any kind of user device to be connected to the node 210. For example, the node user hardware interface 211 may allow a local wired connection to allow the connected device to communicate with the control processor 250. Such local interfacing may be required to configure the node 210 during its manufacture or initial setup. The local interfacing may also allow the connected device to collect current or previous node 210 data, debug an error or malfunction, and/or reconfigure the node 210. To that end, the node user hardware interface 211 may allow an interfacing with any type of device, including but not limited to cell phone, tablet, laptop computer, etc.

FIG. 3 shows an example configuration 300 of a radio network relay node 160 of FIG. 1, according to some embodiments of the present disclosure. The radio network relay node contains a radio network routing relay 310 and may contain a bridging cellular modem 340. The radio network relay node 160 may be deployed in remote areas to relay wireless communication signals between different components of an operating environment (e.g., operating environment 100 shown in FIG. 1) if a remote node 120 is unable to connect to a wireless network access point 140. Radio relay nodes 160 may be chained to relay between themselves for range extension to remote nodes 120 supporting field deployed system 122 equipment. Internally, the wireless radio network relay 310 may be connected to the cellular modem 340 to transfer field equipment data 360 to conventional wireless cellular infrastructure wireless network access points 140 of FIG. 1. For operations, the relay network node 160 may receive communication signal from a remote node (e.g., a node 120 shown in FIG. 1 or node 210 shown in FIG. 2), and connect to a wireless to wired network access point (140 of FIG. 1), and transmit the received communication signals between a central controller (e.g., central controller system 110 shown in FIG. 1). The connection between the wired to wireless network access point and the central controller may be through standard terrestrial information technology (IT) networks. Therefore, the radio network relay node 160 may provide a range extension for different wireless communication nodes.

As shown, the example configuration 300 of FIG. 3 may include a power supply 330, which may include any kind of power sources such as a battery, a solar panel, windmill, etc. The supplied power may enable the internal circuitry within the radio network relay node 160 to operate the radio network relay 310 which may configure the antennas 320 (multiple antennas shown as an illustration, a single antenna may also be used). The antennas 320 may be configured by beamforming techniques to "point" radiated radio power toward desired locations. The throughput of the antennas 310 may also be increased by integrating the MIMO technology. If the wireless network access point 140 utilizes the same radio technology as the radio network relay node 160 for wireless interface, then the radio relay node may directly access information technology internet protocol network infrastructure 150. Additionally, the cellular modem 340 may be contained within node 160 and energized by the power supply 330 to communicate via cellular antennas 350 to cellular network access points 140 to bridge the wireless communications to wired network 150 internet protocol infrastructure.

Figure 4:
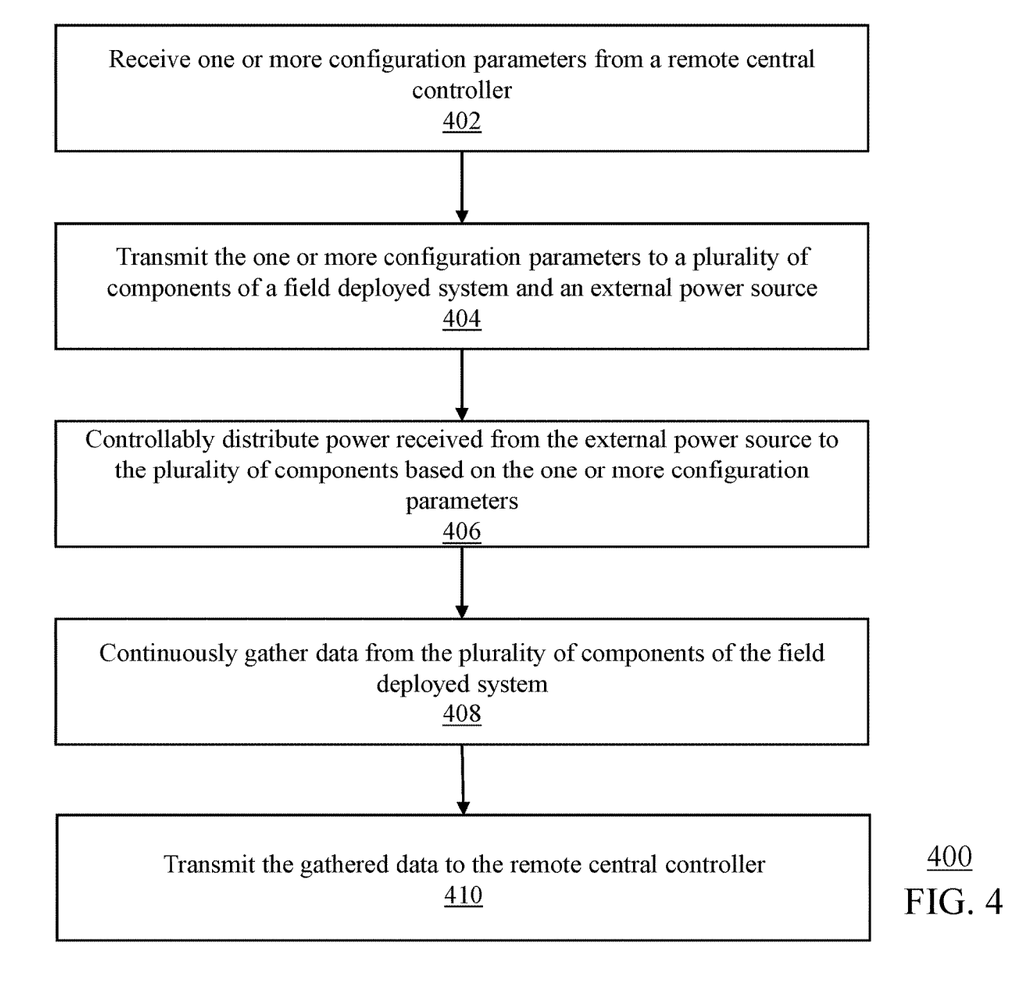
FIG. 4 shows a flow diagram of an illustrative method of providing electrical power and communication functionality to a field deployed system, according to some embodiments of the present disclosure.

FIG. 4 shows a flow diagram of an illustrative method 400 of providing electrical power and communication functionality to a field deployed system, according to some embodiments of the present disclosure. The method 400 may be implemented by a node, such as a node 120 shown in FIG. 1 or a node 210 shown in FIG. 2. It should be understood that the processes shown in FIG. 4 and described herein are merely illustrative and methods with additional, alternative, or fewer number of steps should be considered within the scope of this disclosure.

At 402, the node may receive one or more configuration parameters from a remote central controller. The node may be deployed to supply electrical power and communication links to a field deployed system (e.g., a weapon testing system). The one or more configuration parameters may be for an initial setup of the field deployed system (e.g., for setting up a sensor) and/or an external power source (e.g., an electrical power generator and a rechargeable battery).

At 404, the node may transmit the one or more configuration parameters to a plurality of components of the field deployed system and the external power source. After the power source begins providing power, the node at 406 may controllably distribute power received from the external power source to the plurality of components of the field deployed system. The controlled distribution may be based on the one or more configuration parameters that may indicate to the node how the power should be distributed, e.g., a first component may require 20 V DC power and a second component may require 120 V AC power.

At 408, the node may continuously gather data from the plurality of components of the field deployed system. The gathered data may be sensor data or instrumentation data as these components become operational. At 410, the node may transmit the gathered data to the remote central controller for further analysis.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A node for providing electrical power and one or more communication links to a field deployed system, the node comprising:
at least two power outlets;
a power distributor configured to:
receive electrical power from an external power source and controllably distribute the electrical power to the field deployed system through the at least two power outlets,
convert a portion of the electrical power from:
alternating current power to direct current power, or
direct current power to alternating current power, and
distribute the converted portion of electrical power to the field deployed system through at least one of the at least two power outlets;
an interface comprising a plurality of data ports separate from the at least two power outlets and configured to be connected to data lines of a corresponding plurality of components of the field deployed system;
at least one transceiver configured to transmit or receive data associated with the plurality of components of the field deployed system through a plurality of communication links;
a router configured to route communication messages between the plurality of data ports and the plurality of communication links; and
one or more processors configured to control the power distributor, the plurality of data ports, the at least one transceiver, and the router.

2. The node of claim 1, wherein the at least one transceiver is configured to wirelessly communicate with one or more wireless access points, and wherein the at least one transceiver comprises at least one of: an internet protocol radio, cellular modem, or satellite modem.

3. The node of claim 2, wherein the at least one transceiver is configured to:
receive, from a central controller system through at least one of the plurality of communication links, a configuration parameter for a corresponding component of the field deployed system;
transmit the configuration parameter to the router;
receive, from the router, data from the corresponding component of the field deployed system; and
transmit, through a wireless to wired access point for a terrestrial information technology network, the received data to the central controller system.

4. The method of claim 1, wherein one or more of the power distributor, the interface, and the router configured to be accessed using internet protocol addresses.

5. The node of claim 1, further comprising:
a plurality of sensors, controlled by the one or more processors, and configured to at least one of: geolocate the node, detect an environmental parameter in proximity to the node affecting the performance of the node or the performance of field deployed system, detect a security parameter, or detect a weather parameter.

6. The node of claim 5, wherein the plurality of sensors comprises an accelerometer, and wherein the one or more processors are further configured to:
determine whether a power generator in the external power source is running based on sampling data from the accelerometer; and
transmit the runtime data of the power generator to a central controller system.

7. The node of claim 5, wherein the plurality of sensors comprise a geolocation sensor, and wherein the one or more processors are further configured to:
 determine whether the node has been moved based on sampling data from the geolocation sensor; and
 transmit, to the central controller, an indication that the node has been moved based on the determination.

8. The node of claim 5, wherein the one or more processors, based on the data received from the plurality of sensors, are further configured to monitor at least one of:
 fuel level of the external power source comprising an internal combustion engine;
 emissions to determine air quality;
 operational time for the external power source comprising an internal combustion engine to determine oil life and maintenance schedule;
 operational time of the external power source comprising an electrical generator to determine if one or more components of the electrical generator need servicing;
 operational time of the field deployed system to determine time for servicing of one or more components of the field deployed system or time for recalibration of instrumentation of the field deployed system.

9. The node of claim 1, wherein the node is configured to be mounted on a same platform as the external power source, the node further comprising a local interface configured to connect to a local processing device.

10. A system comprising:
 a central controller comprising one or more applications configured to be executed by one or more computing systems;
 a network configured provide communication between the central controller and a plurality of nodes remote from the central controller, the network comprising radio relay nodes, the network further comprising wireless access points configured to connect wireless communications to a wired terrestrial information technology network;
 the plurality of nodes being configured to provide electrical power and a communication functionality to corresponding field deployed systems, at least one of the plurality of nodes comprising:
  at least two power outlets;
  a plurality of communication links configured to communicate with the central controller through the network;
  an interface comprising a plurality of data ports separate from the at least two power outlets and configured to be connected to data lines of a corresponding plurality of components of the field deployed system;
  a router configured to route communication messages between the plurality of data ports and the plurality of communication links;
  a power distributor configured to:
   receive electrical power from an external power source and controllably distribute the electrical power to the field deployed system through the at least two power outlets,
   convert a portion of the electrical power from:
    alternating current power to direct current power, or
    direct current power to alternating current power, and
   distribute the converted portion of electrical power to the field deployed system through at least one of the at least two power outlets; and
  one or more processors configured to control the plurality of communication links, the interface, the router, and the power distributor.

11. The system of claim 10, wherein the central controller is configured to:
 transmit, through the network, a configuration parameter to a corresponding component of the field deployed system; and
 receive, through the network, feedback data from the corresponding component of the field deployed system.

12. The system of claim 10, wherein the central controller is configured to:
 transmit, through the network, a configuration parameter to the external power source; and
 receive, through the network, operational data of the external power source.

13. The system of claim 10, wherein the central controller is further configured to:
 identify individual network addresses of each of the data ports, power distributor, and the router; and
 generate a network topology mapping based on the individual network addresses.

14. The system of claim 13, wherein at least one of the individual network addresses comprises an internet protocol (IP) address.

15. The system of claim 10, wherein the central controller is further configured to:
 receive, through the network, sensor data generated by at least one sensor in the node;
 determine, based on the sensor data, an operational parameter of the node.

16. The system of claim 10, wherein the operational parameter comprises at least one of a runtime of a power generator in the external power source, environmental conditions around the node, location of the node, or an external device connected to the node.

17. The system of claim 10, wherein the central controller is further configured to:
 receive, through the network, sensor data generated by at least one sensor in the node;
 determine, based on the sensor data, a security breach at the node, wherein the security breach comprises a detection of humans or fauna that impact the node or the field deployed system.

18. A method comprising:
 receiving, by a node providing electrical power and a communication functionality to a field deployed system, one or more configuration parameters from a remote central controller;
 transmitting, by the node, the one or more configuration parameters to a plurality of components of the field deployed system and an external power source;
 controllably distributing, by the node, power received from the external power source to the plurality of components based on the one or more configuration parameters;
 continuously gathering, by the node, data from the plurality of components of the field deployed system;
 transmitting, by the node, the gathered data to the remote central controller.

* * * * *